Nov. 18, 1969  E. W. CALDWELL  3,478,928
DISPENSING DEVICE FOR COLLAPSIBLE TUBES
Filed Nov. 16, 1967  5 Sheets-Sheet 1

INVENTOR.
EDGAR W. CALDWELL
BY
ATTORNEY

INVENTOR.
EDGAR W. CALDWELL
BY
ATTORNEY

Nov. 18, 1969  E. W. CALDWELL  3,478,928
DISPENSING DEVICE FOR COLLAPSIBLE TUBES
Filed Nov. 16, 1967  5 Sheets-Sheet 3

INVENTOR.
EDGAR W. CALDWELL
BY
ATTORNEY

Nov. 18, 1969        E. W. CALDWELL        3,478,928
DISPENSING DEVICE FOR COLLAPSIBLE TUBES
Filed Nov. 16, 1967        5 Sheets-Sheet 4

INVENTOR.
EDGAR W. CALDWELL
BY
ATTORNEY

Nov. 18, 1969     E. W. CALDWELL     3,478,928
DISPENSING DEVICE FOR COLLAPSIBLE TUBES
Filed Nov. 16, 1967     5 Sheets-Sheet
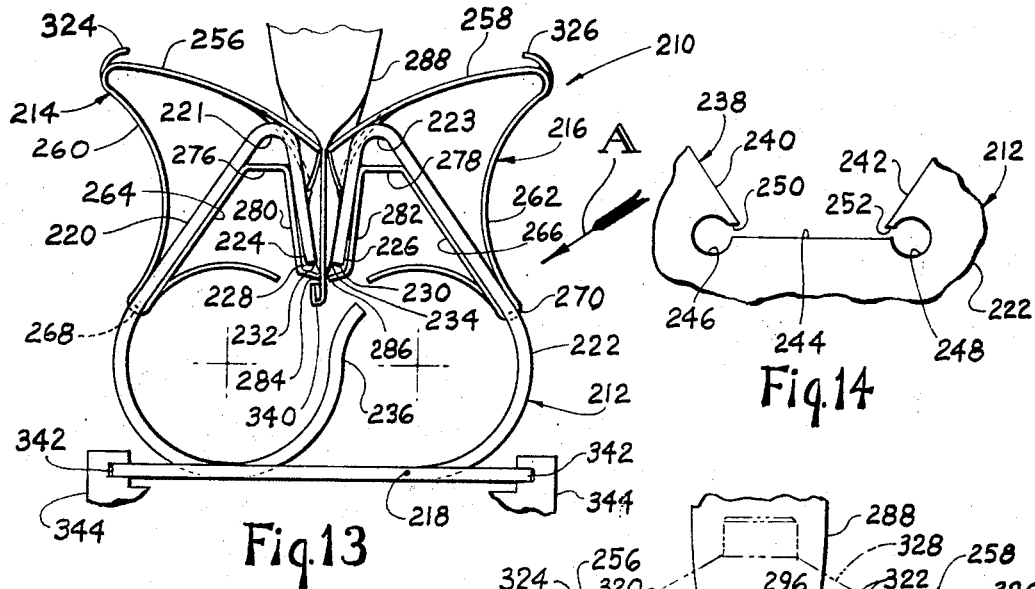
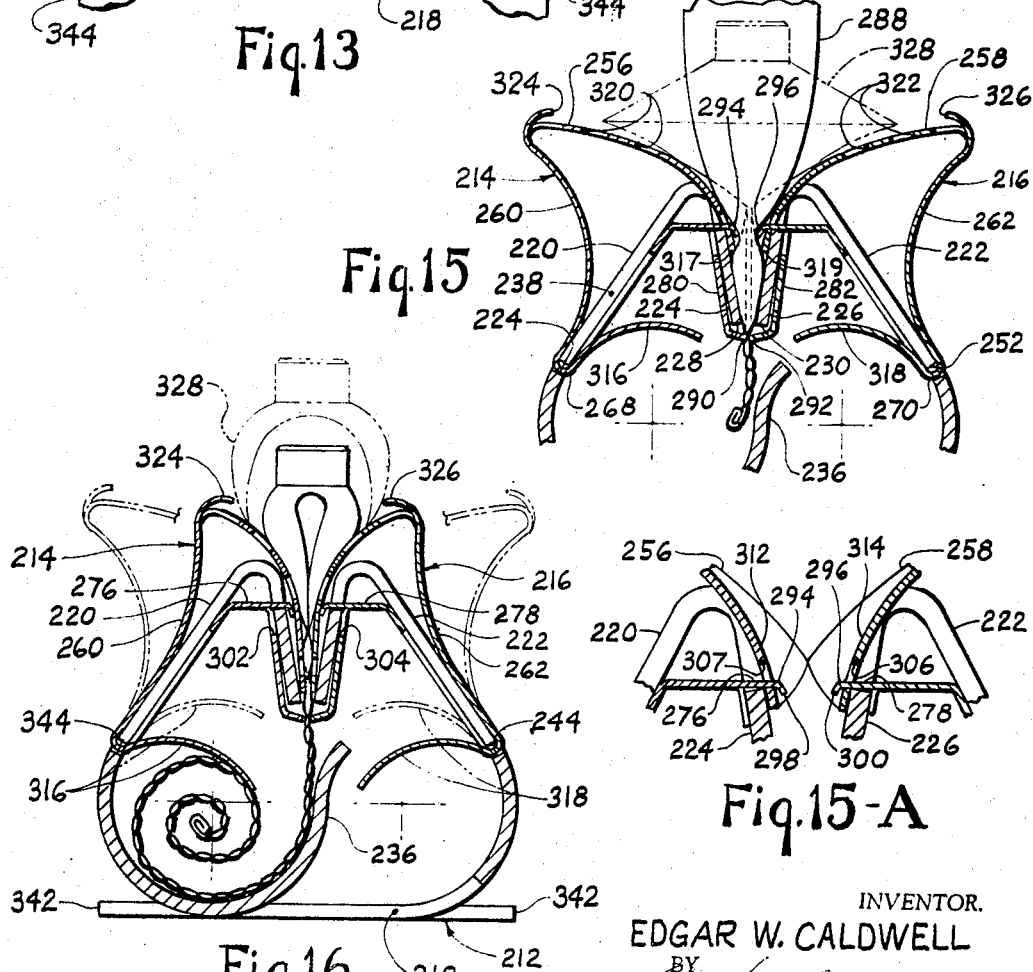
INVENTOR.
EDGAR W. CALDWELL
BY
ATTORNEY

United States Patent Office 3,478,928
Patented Nov. 18, 1969

3,478,928
DISPENSING DEVICE FOR COLLAPSIBLE TUBES
Edgar W. Caldwell, 419 E. LaSalle,
Royal Oak, Mich. 48073
Filed Nov. 16, 1967, Ser. No. 683,610
Int. Cl. B65d 35/28
U.S. Cl. 222—103                          12 Claims

ABSTRACT OF THE DISCLOSURE

A dispensing device having a body provided with an elongated slot, has a pair of manually actuated lever members pivotally supported on the body. The lever members are adapted to engage a collapsible tube situated between the levers, when the levers are rotated toward the tube, so as to both at least partially collapse the tube and thereby expell a portion of the contents of the tube and to drive the tube into the elongated slot so as to cause the slot to further collapse the tube and expel additional quantities of the contents of the tube.

BACKGROUND OF THE INVENTION

Various devices have heretofore been proposed for ejecting paste and the like from collapsible tubes. However, such prior art devices have exhibited many shortcomings which have prevented their adoption. For example, the prior art devices have not been capable of fully stripping the tube and expelling all the contents therefrom. Others have been of such complex design as to require the use of both hands which precludes the easy use thereof as is required with dispensing such products, as for example, toothpaste. Many attempts have been made to simplify the prior art devices; however, such attempts have not been successful. Still others have been of a design which requires the dispenser to be mounted as, for example, on a wall in order to be effectively operated. Such dispensers have not found any substantial degree of acceptance because of their constant visual exposure. Further, in households having children, such wall mounted dispensers must be located at a height which is a compromise between the reaching abilities of the smallest child and the adult members of the family. Even though a compromise in height can be achieved, such compromise is nevertheless usually inconvenient to all those that use the dispenser.

Another deficiency of the prior art devices is their inability to consistently meter and expel a predetermined quantity of the contents, such as paste, out of the collapsible tube. Many attempts have been made to overcome this deficiency. However, such attempts have not proven to be successful.

SUMMARY OF THE INVENTION

The present invention comprises a body having an opening formed therein for receiving therethrough a collapsible tube intended to be squeezed in order to expel at least a portion of the contents of said tube, pivotal lever means carried by said body, said lever means being adapted to be actuated toward said collapsible tube when said tube is situated in said opening for both engaging said tube and forcing said tube further through said opening in order to expell a quantity of said contents, and means carried by said body for gripping said tube and precluding movement of said tube in a direction opposite to that resulting from the action of said lever means in forcing said tube into said opening.

Accordingly, a general object of this invention is to provide an improved collapsible tube discharging means which is capable of completely expelling the contents of the tube.

Another object of this invention is to provide a collapsible tube discharging means which can be easily operated by one hand and which is capable of consistently metering and expelling a predetermined quantity of the contents out of the tube.

Another object of this invention is to provide a collapsible tube discharging means which may be mounted on a wall, if desired, or may be employed as a portable self-supporting stand for a collapsible tube carried therein.

A still further object of this invention is to provide a collapsible tube discharging means which will, while expelling the contents of the tube, cause the collapsible tube to be rolled into a compact mass which can be readily removed from the discharging means without any necessity of in any way disassembling the tube discharging means.

Other more specific objects and advantages of the invention will become apparent when reference is made to the following description considered in conjunction with the drawings.

DESCRIPTION OF THE DRAWINGS

In the accompanying drawings:

FIGURES 5 and 6 are each cross-sectional views taken generally on the plane of line 5—5 of FIGURE 2, looking in the direction of the arrows, showing the various elements in operating positions different from each other and different from that of FIGURE 4;

FIGURE 13 is an end elevational view taken generally on the plane of line 13—13 of FIGURE 10 and looking in the direction of the arrows;

FIGURE 14 is a fragmentary elevational view of the invention as shown in FIGURE 13, taken generally in the direction of arrow A of FIGURE 13 with certain elements omitted for purposes of clarity;

FIGURE 15 is a cross-sectional view taken generally on the plane of line 15—15 of FIGURE 10 and looking in the direction of the arrows;

FIGURE 15-A is an enlarged fragmentary portion of FIGURE 15; and

FIGURE 6 is a cross-sectional view similar to FIGURE 5 but illustrating certain of the elements in a different operating position.

DESCRIPTION OF THE PREFERRED EMBODIMENTS

Figure 1:
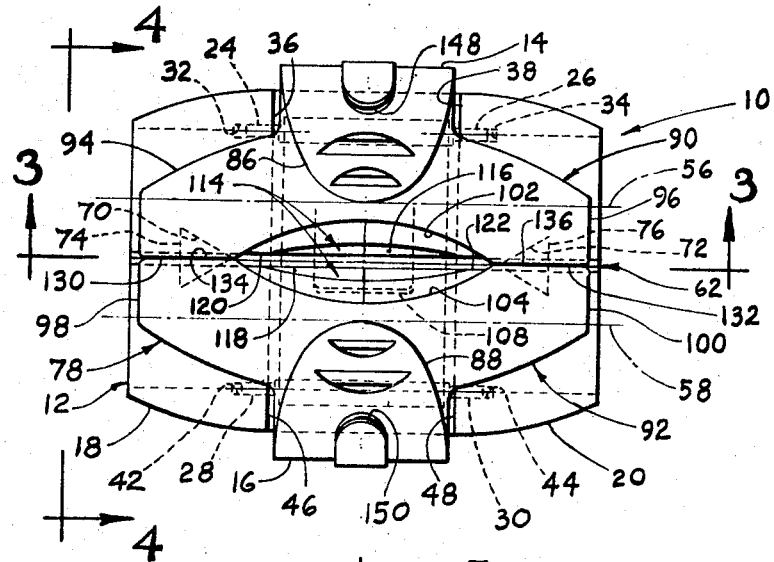
FIGURE 1 is a top plan view of a dispensing device constructed in accordance with the teachings of this invention.
Figure 2:
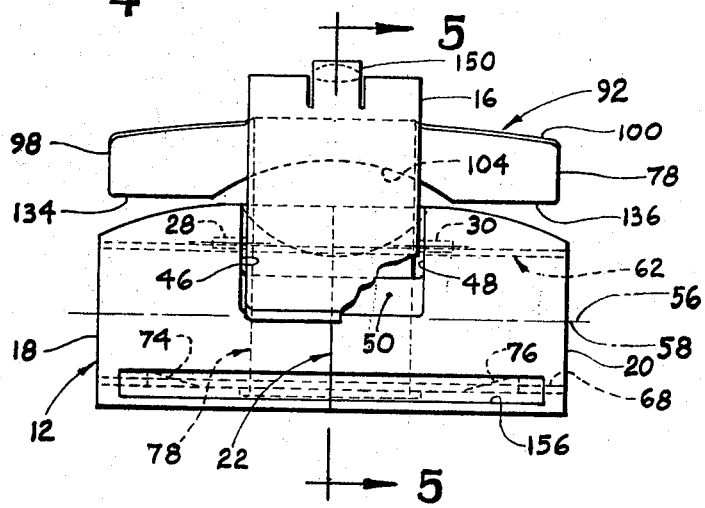
FIGURE 2 is a side elevational view of the invention as illustrated in FIGURE 1.

Referring now in greater detail to the drawings, FIGURE 1 illustrates, in top plan view, a dispensing device 10, constructed in accordance with the teachings of this invention, as comprising a base 12 on which are pivotally mounted actuating levers 14 and 16. Base 12 is preferably formed of aligned body sections 18 and 20 which are retained in general end-to-end juxtaposition, as indicated by the parting line at 22, by a detent mechanism to be subsequently described. Lever 14 is pivotally secured to body sections 18 and 20 as by pivots 24 and 26 which, as illustrated, may be formed integrally with the lever 14; similarly lever 16 has integrally formed pivots 28 and 30 which are received in suitably formed apertures in body sections 18 and 20, respectively. Apertures 32 and 34 for pivots 24 and 26, respectively, are formed in the generally transverse wall portions 36 and 38 of cut-out portion 40 while apertures 42 and 44 for pivots 28 and 30 are formed in transverse wall portions 46 and 48, respectively, of cut-out 50.

Figure 3:
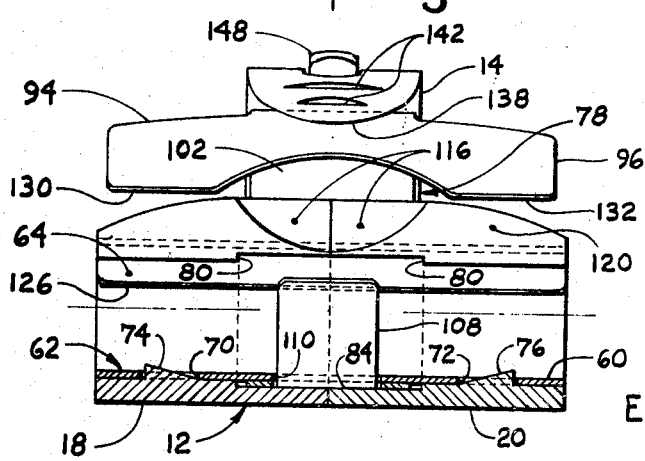
FIGURE 3 is a cross-sectional view taken generally on the line 3—3 of FIGURE 1 and looking in the direction of the arrows.
Figure 4:
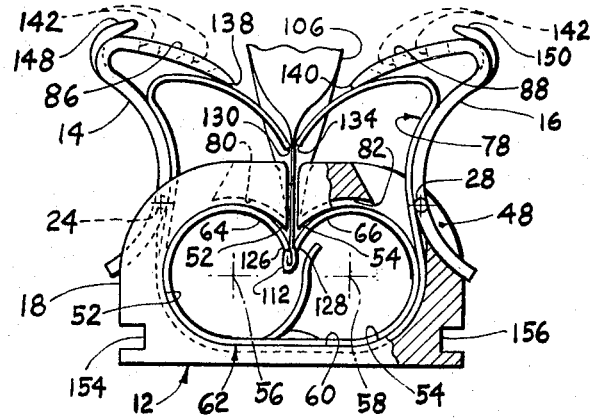
FIGURE 4 is an end elevational view, taken generally on the plane of line 4—4 of FIGURE 1, with portions thereof broken away and in cross-section, and further illustrating a collapsible tube inserted therein with the various elements comprising the invention shown in a released position.
Figure 5:
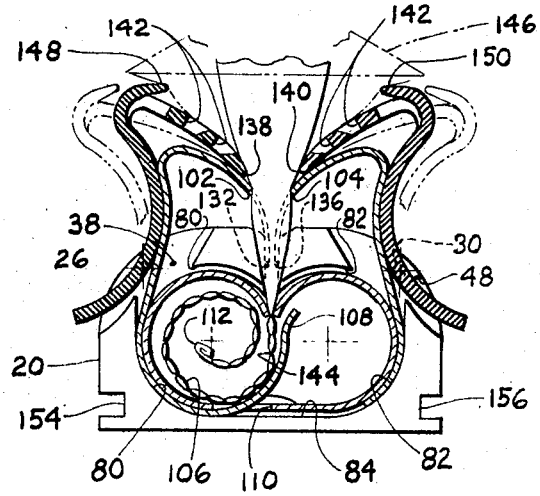
FIGURE 5 is a cross-sectional view taken generally on the plane of line 5—5.
Figure 6:
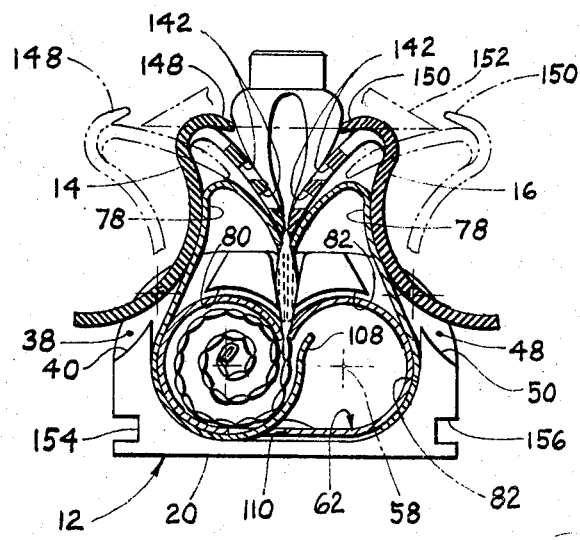

As best seen in FIGURES 4, 5 and 6, each of the body sections 18 and 20 of base 12 are provided with generally cylindrical bores 52 and 54 formed therethrough so as to have their respective centerlines 56 and 58 substantially parallel to each other. The bores 52 and 54 are preferably joined to each other at the lowermost portions by a substantially flat surface 60 which is tangent to the curvature of each of the bores. An elongated barrel or scroll shaped wiper member 62, formed to have oppositely curled arcuate portions 64 and 66, is adapted to be received within the cooperating bores 52 and 54, respectively. The lower portion 68 of wiper 62 is preferably formed to be substantially flat so as to conform to surface 60. As best seen in both FIGURES 1 and 3, wiper member 62 is provided with cut-out portions 70 and 72 which are adapted to respectively receive detents 74 and 76 of body sections 18 and 20, respectively. Accordingly it can be seen that if body sections 18 and 20 are assembled onto wiper 62, as by pushing the body sections onto the wiper from opposite ends thereof, to a point where triangular detents 74 and 76 are respectively received within cooperating apertures 70 and 72, body sections 18 and 20 will be retained in assembled relationship with respect to each other as well as the wiper 62.

Prior to the assembling of body sections 18 and 20 to the wiper member 62, other elements must first be included and properly positioned. For example, a gripper 78, of generally U-shaped configuration as viewed in FIGURES 4, 5 and 6, must first be placed generally about the exterior of wiper 62 and situated midway between the ends thereof and levers or arms 14 and 16 must be positioned generally on the exterior of the gripper 78. In order to accommodate gripper 78, enlarged bores or recesses 80 and 82 are formed in both body sections 18 and 20. The lower portions of bores 80 and 82 are joined to each other by a substantially flat surface 84 similar to joining surface 60.

Now assuming that gripper 78 was assembled about wiper 62, the body section 18 could be pressed onto wiper 62 until detent 74 is received within detent aperture 70 and levers 14 and 16 would then be installed in body section 18 as by means of respective pivot members 22 and 26. Next, body section 20 would be pressed onto the wiper 62, from the opposite end thereof, and urged axially therealong. Pivots 24 and 28 of levers 14 and 16 would be introduced into the cooperating apertures 34 and 44 in body section 20 and the gripper 78 positioned so as to be received within the enlarged bores 80 and 82. Body section 20 is then pushed all the way until detent 76 is received within its cooperating aperture 72 as illustrated, for example, in FIGURE 3. As a consequence of the above, the dispensing device 10 would be in its assembled form.

Referring generally to FIGURE 4, it can be seen that levers 14 and 16 are respectively provided with inwardly turned portions 86 and 88 which are located exteriorly of inwardly bent portions 90 and 92 of the gripper 78. Preferably, as best seen in FIGURE 1, the inwardly directed arms 90 and 92 are provided with generally lateral extensions 94, 96 and 98, 100, respectively. The arms 90 and 92 have their medial portions of the inwardly directed edges contoured as at 102 and 104, respectively, in order to receive therebetween a portion of the collapsible tube or container 106 as shown, for example, in FIGURE 4.

Referring to FIGURES 3, 4 and 5, it can be seen that gripper 78 has a tang portion 108 struck therefrom so as to curled upwardly and received through an accommodating aperture 110 formed in the lower portion of the wiper 62. It is preferred that such a tang be provided in order to facilitate the curling of the end 112 of the tube 106 as it is fed downwardly into the dispensing device 10.

FIGURE 4, an end elevational view of the device illustrated in FIGURE 1, shows the various elements of the dispensing device 10 in a generally released condition. Once the collapsible tube 106 is introduced into the dispensing device 10, the operation of the invention is as follows. Levers 14 and 16 are gripped, as between the thumb and forefinger, and urged inwardly about their respective pivots towards the tube 106. The movement of arms 14 and 16 in turn causes a somewhat similar inward movement of the gripper 78 thereby causing the arm portions 90 and 92 to move inwardly against the tube 106. Continued rotation of both levers 14 and 16 causes the gripper 78 to engage the tube 106 and move it downwardly into the chamber formed generally within the wiper 62. It should be observed that such movement by the gripper 78 causes the laterally extending arm portions 94, 96, and 98, 100 to expell the contents of the collapsible tube 106 in the areas generally to each side of the opening defined by the contoured edges 102 and 104 of the gripper arms 90 and 92. As the tube 106 is forced downwardly a contoured inwardly tapered portion 114, formed in both the top of the body sections 18 and 20 and parallel surfaces 120 and 122 of the longitudinal slot or opening 124, as by opposed arcuate tapering surfaces 116 and 118, receives that portion of the tube 106 which is generally held in the opening defined by the contoured edges 102 and 104 of the gripper 78. As the tube 106 is further forced downwardly, the surfaces 120 and 122, including those portions immediately below the arcuate tapering surfaces 116 and 118, serve to further expell the contents from the tube. Whatever amount may remain in the tube 106 is further urged upwardly and expelled by the wiping action of the inwardly curled edges 126 and 128 of the generally barrel-shaped wiper 62. The wiper 62 serves a dual function in that it not only serves to expell all of the contents that may remain in the tube but it also bites into the surface of the collapsed portion of the tube so as to preclude the upward withdrawal thereof.

In order to explain the operation of the invention in still greater detail, reference will now be made to FIGURES 4 through 9. Levers 14 and 16 are made of a material which is substantially rigid. This is in contrast to the gripper 78 and wiper 62. The gripper 78 is formed of a relatively resilient material so that it serves, among other things, as a spring tending to maintain the levers 14 and 16 in positions as illustrated in FIGURE 4. However, even though gripper 78 is relatively resilient, it nevertheless is of sufficient strength as to preclude permanent deformation of the inwardly directed arms 90 and 92 as well as the lateral extensions 94, 96 and 98, 100 during periods when levers 14 and 16 urge the gripper arms 90 and 92 inwardly against the tube 106. Wiper 62 is also formed of relatively resilient material so that the inwardly curled ends 64 and 66 thereof function as a somewhat stiff spring tending to move radially outwardly against the confines of the surfaces of bores 52 and 54. Once the dispensing device is assembled, the collapsible tube 106 is inserted by pushing the normally flattened end 112 thereof downwardly between the free ends of the gripper arms 90 and 92, through the longitudinal opening 124 formed in the top of base 12, and between the edges 126 and 128 of the curled ends 64 and 66 of wiper 62. At this time the tube 106 will be in a position as generally illustrated in FIGURE 4.

As seen in, for example, FIGURE 1, the lateral projections of the gripper arm portions 90 and 92 are provided with straight edges 130, 132 and 134, 136, respectively, which terminate in the contoured edges 102 and 104. Accordingly, as the tube 106 is inserted, the edges 130, 134 and 132, 136 cooperate in collapsing the sides of the tube while the medial portion of the tube is generally accommodated by the contoured edges 102 and 104.

Whenever it is desired to expell a quantity of the tube contents, levers 14 and 16 are rotated about their pivots thereby urging gripper arms 90 and 92 generally inwardly. The edges 130, 132, 134 and 136 as well as the contoured edges 102 and 104 tend to bite into the collapsible container and since they are generally oppositely disposed, a resultant force is created in a vertical direction causing the tube 106 to be moved downwardly through the longitudinal slot or opening 124 and between ends of wiper 62.

Figure 7:
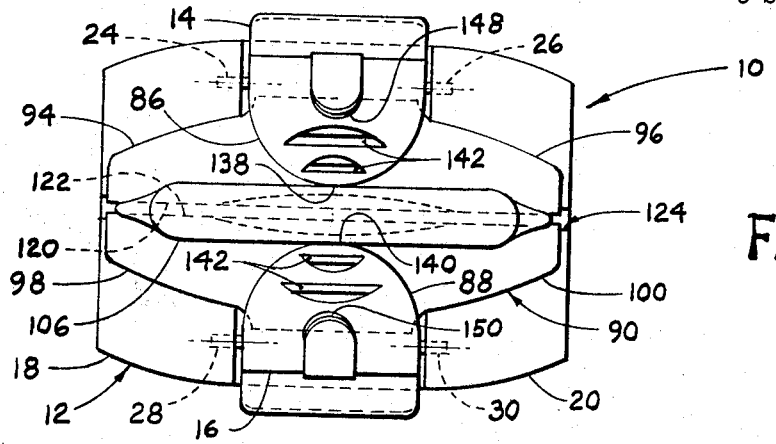
FIGURES 7, 8 and 9 are top plan views of the invention illustrated in FIGURE 1 but respectively corresponding to the operating positions of the elements as shown in FIGURES 4, 5 and 6.
Figure 8:
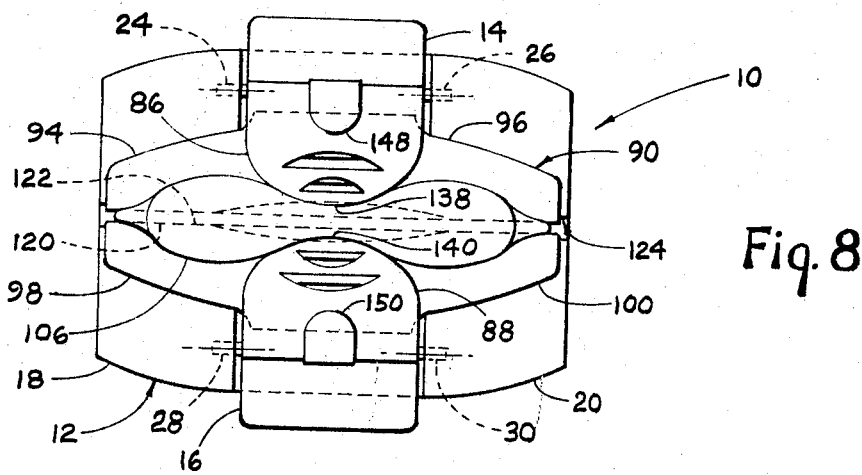
Figure 9:
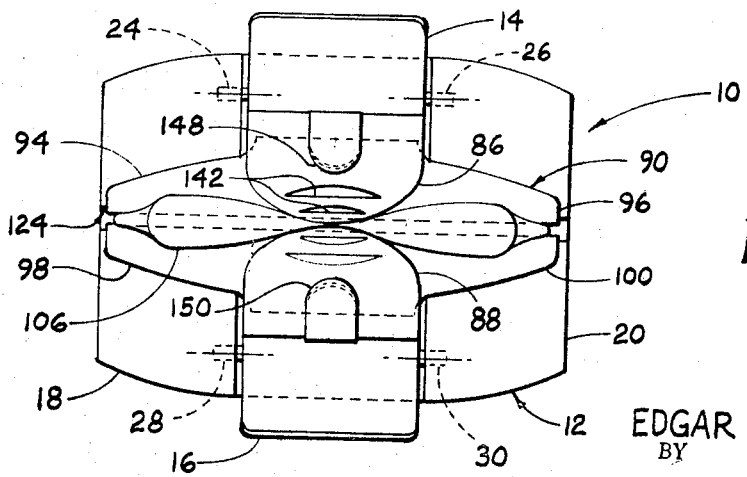

FIGURES 4, 5 and 6 illustrate three different positions in the overall operating cycle. FIGURE 4 could be considered as illustrating the start position; that is, at this time the edges 130 and 134 (as well as edges 132 and 136) are against the surface of the collapsible tube or container 106 and levers 14 and 16 are respectively rotated counter-clockwise and clockwise to their illustrated retracted positions. In FIGURES 7, 8 and 9, tube 106 is illustrated as if it were sectioned by a plane passing generally through ends 138 and 140 of levers 14 and 16 and parallel to axes 56 and 58.

As illustrated by FIGURES 4 and 5, when levers 14 and 16 are gripped and rotated so as to have portions 86 and 88 move towards each other, edges 130 and 134 as well as edges 132 and 136, of gripper 78, respectively cooperate with each other in somewhat biting into the surface of the collapsible tube 106. Continued rotation of levers 14 and 16 causes corresponding movement of arms 90 and 92 of gripper 78, principally by flexing the resilient spring-like gripper 78 about the wiper barrels 64 and 66, resulting in the tube 106 being pushed downwardly through the slot 124 defined by surfaces 120 and 122.

FIGURES 5 and 8 illustrate what might be considered an intermediate position in the operating cycle. That is, as the tube 106 is moved from the position of FIGURES 4 and 7, the tapered contoured opening 114, in base 12, has begun to accept more of the tube body and at the same time, because of its inward taper acting as a funnel, started to cause the contents of the tube to be squeezed and displaced upwardly. Such upward displacement of the tube contents by the contoured surfaces 116 and 118 is permitted by the opening in the gripper 78 defined by the contoured edges 102 and 104. At the same time further squeezing action is achieved by the surfaces 120 and 122, of slot 124, including the portions thereof below the contoured taper surfaces 116 and 118, and as the tube 106 is forced downwardly the curled portions 64 and 66 of wiper 62 cause the edges 126 and 128 thereof to continually resiliently engage opposite sides of the tube 106 thereby generally wiping the tube so as to further cause the contents of tube to be forced upwardly into the generally centrally disposed portion of tube 106 located intermediate the contoured edges 102 and 104.

Also, as best seen in FIGURE 5, as levers 14 and 16 are rotated to some intermediate position, the laterally extending portions of arms 90 and 92 begin to be received generally within the slot 124. This is illustrated as by lateral portions 96 and 100 of arms 90 and 92, respectively, shown being partly received between surfaces 120 and 122 of slot 124. A portion of the tube 106 is also between the lateral portions 96 and 100 thereby experiencing an increased squeezing action therebetween because of the confining action presented by slot surfaces 120 and 122.

Further, in comparing FIGURES 4 and 5, as well as FIGURES 7 and 8, it can be seen that as levers 14 and 16 are rotated to the positions shown in FIGURES 5 and 8, the inwardly directed arm portions 86 and 88 begin to engage, as by arm ends 138 and 140, opposite sides of tube 106 so as to also effect an expelling action on the contents of the tube 106. At this time it might be best to point out that arm portions 86 and 88 are preferably provided with a plurality of indentations or cut-out portions 142 which function as additional grippers against the outer surface of the tube 106. The grippers 142, as best illustrated in FIGURES 5 and 6, become increasingly more effective as the levers 14 and 16 are further rotated from the start position of FIGURE 4.

FIGURES 6 and 9 illustrate the levers 14 and 16 in the fully actuated position. At this time, as can be seen by the cross-section of the tube 106, ends 138 and 140 of lever arms 86 and 88 have substantially totally compressed a medial portion of the tube 106. Further, because of the full rotation of levers 14 and 16, lateral extensions 94, 96 of arm 90 as well as lateral extensions 98, 100 or arm 92 will have extended into the longitudinal slot 124 causing at least a major portion of the contents of that portion of the tube 106 which is generally within the slot 124 and generally between arms 90 and 92 to be completely displaced upwardly within the tube 106.

As the levers 14 and 16 are released, arms 90 and 92 of gripper 78 withdraw from slot 124 and return to the position shown in FIGURE 4. However, any tendency of the tube 106 to move upwardly with arms 90 and 92 is effectively precluded by the inwardly curled edges 126 and 128 of wiper 62. As the tube 106 is forced downwardly, wiper 62 permits sliding motion therebetween; however, because of the curled edges of wiper 62 being in continuous contact with the tube 106 and also urged toward each other by the curled portions 64 and 66, any tendency of the tube to move upwardly causes edges 126 and 128 of wiper 62 to bite into the collapsed tube and thereby prevent its upward movement.

The lateral extensions 94, 96 and 98, 100 of gripper arms 90 and 92 and the curled edges 126 and 128 of wiper 62 perform another important function. That is, by causing the arms 90 and 92 to substantially completely expell the contents of the tube in the area defined generally by said extensions, the wall of the tube 106 is collapsed to be substantially flat and very thin at its opposite extremities. Further, the biting action of the curled edges 126 and 128 of wiper 62 causes slight indentations 144 along such flattened edges or extremities. As a consequence of such indentations, the curling characteristics of the flattened tube are enhanced. For example, referring to FIGURES 4, 5 and 6, it can be seen that as end 112 of tube 106 progresses downwardly it finally engages tang 108 which tends to bend the flattened tube. Because of the indentations 144 formed by edges 126 and 128, incremental stress concentrations are formed in the tube by the deflecting action of tang 108. Accordingly, the tube 106 proceeds to kink or bend at such indentations as the indentations 144 progress towards tang 108 and the end 112 begins to form a spiral curl generally about the axis 56 of bore 52. The end 112 will continue to curl in this manner until the tube 106 is totally collapsed.

As the tube 106 is fed downwardly through continued use, the usual conical outlet end 146 is increasingly deformed downwardly so that the arm portions 86 and 88 are able to engage the conical portion 146 and expell the contents from that vicinity, as illustrated generally in FIGURE 6. The transverse grooves or grippers 142 aid in engaging and retaining the deformed conical end portion 146. Further, as illustrated in each if FIGURES 1–9, levers 14 and 16 are preferably provided with tab portions 148 and 150, respectively, which are struck out of arm portions 86 and 88. As best seen in FIGURE 6, the tabs or abutments 148 and 150 provide a further gripping and squeezing force against the deformed conical end 146 in order to assure the expelling of the tube contents from that region. It can be seen, for example, as at 152 that after the tube 106 has progressed downwardly a sufficient distance that the conical end 146 is placed in position for being engaged and deformed by the tabs 148 and 150.

Once the tube 106 has been completely evacuated the tube can be removed from the dispensing device 10 merely by sliding the tube between the gripper arms 90 and 92 in a direction generally parallel to axis 56 through either open end of the wiper 62 and thusly out of the longitudinal slot 124.

Further, as illustrated at 154 and 156, suitable slots may be formed in base 12 so as to enable the dispensing device to be mounted as by a bracket to either a wall or placed in a position inverted from that as illustrated. However, in any event, because of the base 12, the entire device is completely portable and also serves as a supporting stand for the collapsible tube 106.

FIGURES 10 through 16 illustrate another embodiment of the invention. For example, FIGURES 10, 11 and 12 (FIGURE 10 being a top plan view) illustrate the dispensing device 210 as being comprised of a single-piece body 212 upon which are mounted deflectable grippers 214 and 216.

Body 212 includes a base portion 218 from which are formed upwardly extending side walls 220 and 222 which, as also shown by FIGURES 13, 15 and 16, are inclined toward each other as they extend upwardly. Each of the walls 220 and 222 are also generally bent back forming bight portions 221 and 223 with downwardly depending wall portions 224 and 226 respectively having free ends 228 and 230. The ends 228 and 230 have edges 232 and 234, respectively, which, as indicated by any of FIGURES 10, 13, 14 or 15, are in relatively close proximity to each other.

A tang-like portion 236 is struck from the body 212, primarily from the base 218 thereof, and curled upwardly so as to form an arcuate-like configuration when viewed, for example, as in FIGURE 13. Tang 236 provides the same function as tang or guide 108 of FIGURES 1 and 3.

As seen in FIGURES 10, 11, 12, 13, 15 and 16, and fragmentarily in FIGURE 14, each of the walls 220 and 222 are provided with a cut-out portion 238 which includes generally side edges 240, 242, a bottom edge 244, arcuate clearance holes or slots 246 and 248 which generally intersect lower or bottom edge 244. FIGURE 14 best illustrates the preferred manner of having the clearance holes 246 and 248 join the side edges 240 and 242 which, as shown, is by intermediate joining or land portions 250 and 252, respectively. As shown, for example, by FIGURES 10 and 11, the side edges 240 and 242 of the openings 238 each join a generally upper edge or surface 254 formed in each of the depending wall portions 224 and 226. As clearly shown in FIGURES 11 and 12, each of the openings 238 extend through the respective bight portions 221 and 223 in the process of joining edges 254.

Preferably, grippers 214 and 216 are made to be substantially identical to each other and as will be seen, may be used on opposite sides of the body 212. However, the corresponding pertinent elements comprising the grippers will be designated by different reference numbers where such is considered useful for purposes of clarity.

Figure 10:
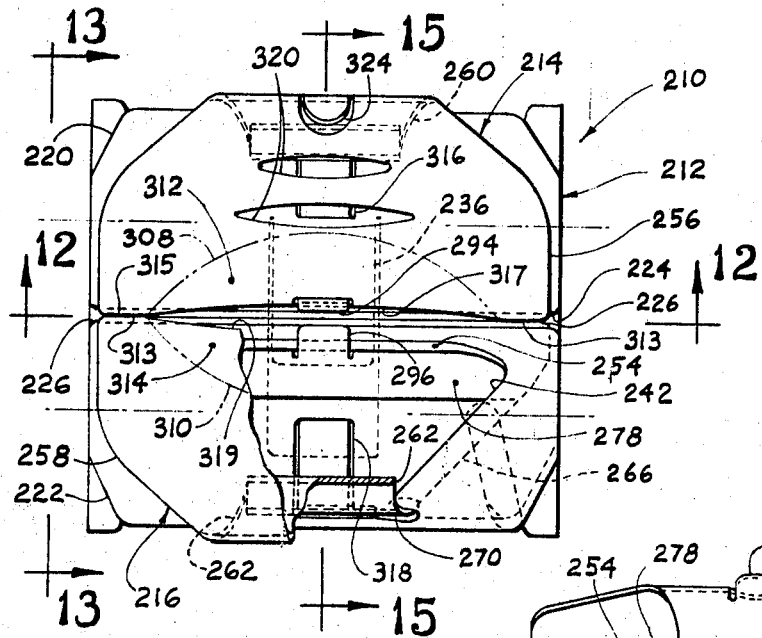
FIGURE 10 is a top plan view of another embodiment of the invention.
Figure 11:
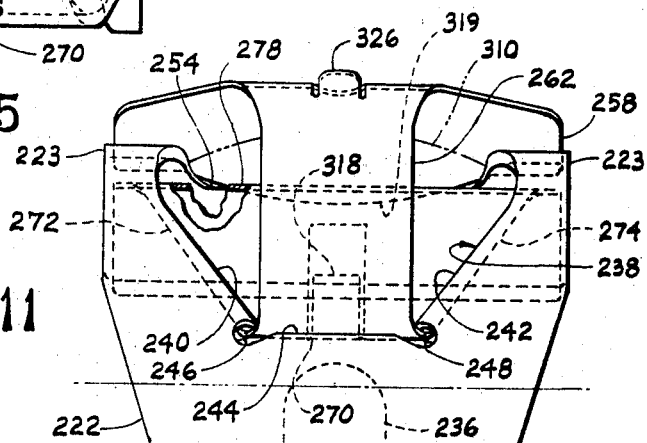
FIGURE 11 is a side elevational view of the invention as shown in FIGURE 10.
Figure 12:
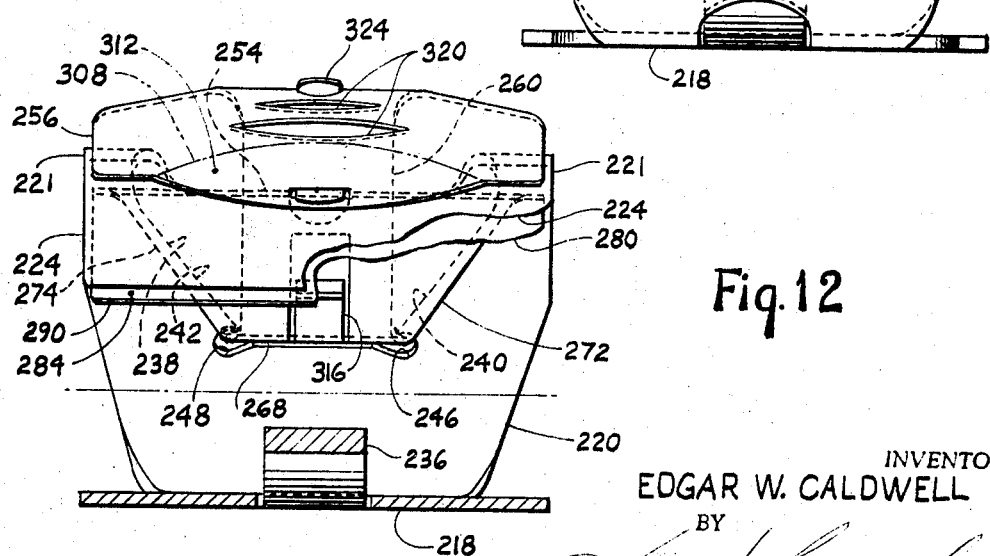
FIGURE 12 is a cross-sectional view taken generally on the plane of line 12—12 of FIGURE 10, looking in the direction of the arrows, with additional portions thereof broken away for purposes of clarity.

As seen in FIGURE 10, grippers 214 and 216 are respectively comprised of relatively large longitudinally extending blade-like portions 256 and 258 which, in turn, are connected to relatively narrow actuating lever portions 260 and 262 (FIGURES 11 and 12). The lever portions 260 and 262, as shown in FIGURES 13 and 15, are of generally arcuate configuration when viewed from the end of the dispensing device 210.

Further, lever assemblies or grippers 214 and 216 also include upwardly extending locking legs 264 and 266 which are respectively joined to the arcuate lever portions 260 and 262 as by generally U-shaped bight portions 268 and 270. As seen in, for example, FIGURES 11 and 12, legs 264 and 266 are formed so as to have their side edges 272 and 274 in a pattern similar to but wider than edges 240 and 242 of the openings 238.

Legs 264 and 266 are provided at their uppermost end with generally horizontally disposed and longitudinally extending bridging or bight portions 276 and 278 which, in turn, are respectively integrally joined to downwardly depending legs 280 and 282. Generally longitudinally extending flange-like portions 284 and 286 are formed on the lowermost portions of legs 280 and 282, respectively, and directed so as to be opposed to each other when assembled as illustrated by, for example, FIGURES 13, 15 and 16. Flanges 284 and 286 are preferably of a length so that in the absence of a collapsible container or tube 288, the edges 290 and 292 of flanges 284 and 286 abut against each other. The depending legs 280 and 282 have struck therefrom tongue-like portions 294 and 296, respectively, which, preferably, have their projecting ends bent slightly downwardly as at 298 and 300. Tongues or catches 294 and 296 are formed as to project generally in the same plane as the bridging or bight portions 276 and 278. Being struck from legs 280 and 282, the tabs 294 and 296 result in openings 302 and 304 formed in legs 280 and 282.

The purpose of tabs 294 and 296 is twofold; for example, first, tab 296 is intended to lie over the surface or edge 254 of the cut-out 238 so as to maintain the legs 266 and 282 in a wedged-like condition against the inner surfaces of walls 222 and 226 of the body 212. Secondly tab 296 projects sufficiently beyond wall 226 so as to pass through an aperture 306 formed in the blade-like gripping portion 258. As shown by the phantom lines 308 and 310 on grippers 214 and 216, the generally medial portions 312 and 314 are somewhat dished or bowed inwardly to form concave-like depressions which blend with the remaining portions of the blades 256 and 258 as at lines 308 and 310. As best illustrated by FIGURE 15, the bowed or concave portions 312 and 314 respectively contain apertures 307 and 306 and are also retained, when in fully retracted position, against the downwardly depending walls 224 and 226. As a consequence of the bowed portions the gripping edges 313 and 315, when viewed in FIGURE 10, provide an opening defined by bowed edge portions 317 and 319 and, at the same time when viewed in FIGURES 11 and 12, provide downwardly depending arcuate gripping edges. Tabs 294 and 296 thusly projecting through apertures 307 and 306 retain the blade portions in the positions illustrated when the grippers 214 and 216 are in the fully retracted position as illustrated by FIGURES 13, 15 and 15–A.

In addition to the above, arcuate deflector arms 316 and 318 are respectively struck and formed from legs 264 and 266 of grippers 214 and 216. As viewed in either of FIGURES 13, 15 or 16, the deflector arms assume an arcuate configuration and at times function, as illustrated in FIGURE 16, to assure proper curling of the evacuated portion of the collapsible tube 288.

Similarly to the embodiment of FIGURE 1, grippers 214 and 216 are respectively provided with additional gripping notches or cut-outs 320 and 322 as well as abutment tabs 324 and 326. The abutment tabs, as discussed with reference to FIGURES 1 through 9 are extremely effective in collapsing the conical end portion 328 of the collapsible tube 288 when the tube is fully fed downwardly as illustrated in FIGURES 15 and 16.

The invention as disclosed in FIGURES 10 through 16 can be assembled as by holding the lever assembly 216 in a somewhat cocked position so as to first introduce, for example, the right end of the inner leg 266 (as viewed in FIGURE 11) and the right end of downwardly depending inner leg 282 through the opening 238 so as to generally force such right end under right end of bight 223 while the arm or blade portion 258 is maintained generally above the same bight 223. Next, the entire lever 216 can be forced sideways to the right so as to slide the bight portion 270 of the lever 216 into the clearance cut-out or hole 248 (also see FIGURES 13, 14 and 15) while maintaining the bight 270 in general contact with the lower surface 244 of cut-out 238. At this point, there is sufficient clearance afforded by edge 240 of cut-out 238 to permit the lever assembly 216 to be rotated in order to cause the left end (as viewed in FIGURE 11) of leg 266 and the left end of downwardly depending leg or wall 282 to pass through the opening 238. Subsequently, the lever assembly 216 can be forced to the left so as to place a portion of the lever bight 270 to be contained by the lower surface or edge 244 and each of the joining or land portions 250 and 252. Once the lever is placed in such position, it is then capable of pivotal motion generally about its bight portion.

In order to retain legs 266 and 282 in the position illustrated the tab 296 is extended over the generally horizontal surface 254 of the cut-out 238. Further, since the lever assemblies 216 and 214 are of relatively resilient material and arm portions such as 262 and 258, as viewed in FIGURE 15, would, if released, would generally rotate clockwise about bight 270, tab 296 is made to also extend through aperture 306 (see FIGURE 15-A) in order to retain the lever 216 in the position illustrated when such lever is in a released condition.

The same procedure as set out above with respect to lever 216 can be employed for assembling lever 214 to the body 212.

The operation of the invention as disclosed by FIGURES 10–16 is much the same as that of the embodiment disclosed in FIGURE 1. For example, the tube 288 is inserted between the levers 214 and 216, much as generally illustrated by FIGURE 13, in a manner preferably causing the lower end 340 to be at least engaged by edges 290 and 292 or slightly below such edges. As can be seen by, for example, FIGURES 10 and 15, the contoured edges 317 and 319 of the disked portions 312 and 314 of the levers 214 and 216 form a slight clearance opening for the reception therebetween of the tube 288.

As levers 214 and 216 are squeezed toward each other, as by gripping the lever portions 260 and 262, the contour and arcuate configuration of the lever arm 256 and 258 cause the edges 313 and 315 as well as edges 317 and 319 to engage and somewhat bite into generally opposite sides of tube 288 in a somewhat downward direction. The entire levers 214 and 216 are comprised of spring-like material thereby enabling each portion thereof of exhibit a degree of resiliency. Accordingly, as levers 214 and 216 are further urged toward each other, the lever portions 260 and 262 are layed against the outer surfaces of the side walls 220 and 222 thereby effectively changing the arcuate distance from the respective bight portions 268 and 270 to the arms 256 and 258. Consequently, as the tube 288 is being forced downwardly between edges 232, 234 of depending walls 224, 226, the portions of arms 256 and 258 closer to the lever portions 260, 262 cause a further squeezing action against the tube 288 as illustrated, for example, in FIGURE 16. At the same time deflection of lever 214 causes rotation of the arm 316 from the position shown in FIGURE 13 to that illustrated in FIGURE 16. The purpose of rotating arm 316 is to assure the curling of the collapsed portion of the tube 288. Every time lever 214 is actuated, lever arm 316 rotates and abuts against the collapsed portion of tube 288 causing it to be further kinked or curled into a spiral.

As between FIGURES 15 and 16, it should be noted that arms 256 and 258, when urged toward each other, ride over the projecting tabs 294 and 296 (FIGURE 15-A). This is due partly to the lengthening of the lever portion 260 as previously explained. However, when levers 214 and 216 are released, projecting tabs 294 and 296 once again respectively enter apertures 307 and 306 of levers 214 and 216.

As tube 288 is forced downwardly, flange portions 284 and 286 of the levers 214 and 216, respectively, generally ride over the opposite sides of tube 288 by flexing the leg or wall portions 280 and 282. However, after the levers 214 and 216 have been moved to their maximum stroke position as shown in FIGURE 16 and then released, the edges 290 and 292 of flanges 284 and 286 bite into the evacuated portion of the collapsible tube 288 and prevent any tendency which the tube might have to move upwardly with the general withdrawal of the arms 256 and 258 of levers 214 and 216. Once the tube 288 is sufficiently evacuated, it may be easily removed as by merely sliding it along the slot between legs 224 and 226 and out of either end of the body 212.

The purpose of cut-outs or gripping portions 320 and 322 and abutments 324 and 326 is the same as that of gripping portions 142 and abutments 148 and 150 of the embodiment in FIGURES 1–9. Further, body 212 is preferably provided with feet-like extensions 342 which may be employed, as shown in FIGURE 13, in combination with a suitable mounting bracket 344 enabling the placement of the device 210 in an inverted position if so desired.

In view of the preceding it can be seen that both embodiments of the invention provide an arrangement which enables a metered quantity of the contents to be expelled from the collapsible tube. That is, when the levers of either embodiments are depressed to their full extent, the same quantity will be expelled. However, as is apparent, it is not absolutely necessary that this quantity be expelled everytime; that is, the levers could be only partially actuated thereby expelling any desired fraction of the otherwise normal volume expelled when the levers are fully actuated.

Further, both embodiments can be manipulated and used with one hand leaving the other hand free to accomplish an associated task. And, as is evident, when not being used to expell contents from the tube, the dispensing device, with the tube held therein, can be placed, for example, on a shelf since the dispensing devices also function as their own supporting stands.

If desired, a mounting bracket 344 can be secured to a wall so as to receive therein either of the dispensing devices. This enables the use of the invention while so supported by the bracket and yet permits the dispensing device to be withdrawn from the support bracket for use and subsequently returned thereto.

Although only two embodiments of the invention have been disclosed and described, it is apparent that other embodiments and modifications of the invention are possible within the scope of the appended claims.

I claim:
1. A device for holding and expelling the contents of a collapsible tube, comprising a body including upper, lower and side portions, a bore formed in said body, a relatively narrow elongated tube-collapsing slot formed in said upper portion of said body and extending downwardly to said bore, and a pair of lever members pivotally carried by said side portions of said body and oppositely disposed about said elongated slot so as to have pivotal action about axes which are substantially parallel to said elongated slot, said lever members being effective to engage and grip outer surfaces of said collapsible tube in order to forcibly drive said tube downwardly into said narrow elongated tube-collapsing slot, said lever members and said narrow elongated tube-collapsing slot effectively engaging said outer surfaces of said collapsible tube as said tube is forcibly driven into said slot to thereby collectively collapse a portion of said collapsible tube and expel a quantity of said contents from said collapsible tube.

2. A device for holding and expelling the contents of a collapsible tube according to claim 1 wherein said lever members include arm-like portions so as to have free swingable ends generally directed toward said narrow elongated slot and toward each other, said arm portions being so formed as to present outer tube-engaging arcuate surfaces which have the center of curvature thereof disposed so as to be eccentric with respect to the axes of rotation of said lever members.

3. A device for holding and expelling the contents of a collapsible tube according to claim 2 wherein said lever members include upstanding abutment means carried thereby for engaging and collapsing the end of said tube when said collapsible tube is nearly completely evacuated of its said contents.

4. A device for holding and expelling the contents of a collapsible tube according to claim 1 including deflecting means contained within said bore for causing the collapsed portion of said tube to undergo a relatively tight curling action as said tube is driven downwardly through said elongated slot, said elongated slot being formed as to have at least one open end theerby permitting said collapsed curled tube to be withdrawn from said body by merely sideways sliding said collopsed tube through said open end.

5. A device for holding an expelling the contents of a collapsible tube, comprising a first base section, a second base section, first and second substantially parallel bores formed through each of said base sections, said bores being formed so as to define generally oppositely disposed cylindrical surfaces joined at their lowermost portions by a substantially flat surface tangent to said cylindrical surfaces, a first detent formed on said flat surface in said first base section, a second detent formed on said flat surface in said second base section, a slot formed in the upper surface of each of said base sections and extending into said bores, a wiper member having sides curled so as to be oppositely disposed to each other in order to present juxtaposed curled edges, first and second detent-receiving apertures formed in said wiper member, said wiper member being tightly received within each of said bores of each of said base sections in order to join said base sections in generally end-to-end relationship and being positioned so that the curled edges are in general alignment and generally juxtaposed to said slots, said detents and detent-receiving apertures cooperating to prevent unintentional disengagement between said base sections and said wiper member, first and second levers pivotally secured to both of said base sections in a manner so as to be generally oppositely disposed about said slots, a resilient gripper member received generally between said wiper member and said base sections, said gripper having upwardly directed portions with generally inwardly bent arm portions formed at the ends thereof, said gripper arm portions being confined by said levers so as to be generally between said levers and said base section, said gripper arm portions including contoured edges adapted for engaging and driving said collapsible tube downwardly through said slots and said curled edges whenever said levers are rotated against said upwardly directed portions and inwardly bend arm portions of said gripper in order to expel the contents from said tube, and a tang-like member formed integrally with said gripper member provided in the bores so as to form a curvature abutment portion for curling the end of said collapsible tube as said tube is fed through said slots and said curled edges.

6. A device for holding and expelling the contents of a collapsible tube, comprising a body including upper, lower and side portions, a bore formed in said body, a relatively narrow elongated slot formed in said upper portion of said body and extending downwardy to said bore, and a pair of lever members pivotally carried by said side portions of said body and oppositely disposed about said elongated slot so as to have pivotal action about axes which are substantially parallel to said elongated slot, said lever members being effective to engage and grip outer surfaces of said collapsible tube in order to drive said tube downwardly into said narrow elongated slot thereby collapsing a portion of said collapsible tube and expelling a quantity of said contents from said collapsible tube, said body comprising a unitary member formed as to have a base portion with said side portions supported thereby and extending upwardly therefrom, said side portions being generally inclined from the verticle and toward each other, each of said side portions having formed bight portions with a downwardly depending wall extending from each of said bight portions, each of said walls terminating at their respective lowermost portions in free ends, said downwardly depending walls converging toward each other and diverging away from the supporting associated side portions as each of said walls depends downwardly, and the free ends of said walls being substantially parallel to each other and in relatively close proximity thereby defining said elongated slot therebetween.

7. A device for holding and expelling the contents of a collapsible tube according to claim 6 wherein each of said side portions includes a cut-out portion, each of said cut-out portions being adapted to receive therethrough one of said pair of levers, each of said cut-out portions also being adapted to provide for a pivotal motion as between said levers and said side portions.

8. A device for holding and expelling the contents of a collapsible tube according to claim 7 wherein each of said levers comprises a unitary member having a first wedging portion detachably secured within and generally between said one of said downwardly depending walls and associated side portion, a bight portion situated in and retained within a lower portion of the cut-out in said associated side portion, an arcuate lever portion joining said bight portion and extending upwardly therefrom to a point at an elevation above said bight portions of said side portion, and a deflectable arm formed generally at the uppermost end of said arcuate lever portion terminating in an edge adapted for engaging and gripping said collapsible tube, said levers being effective upon being urged toward each other to engage and grip said collapsible tube from opposite sides thereof in order to drive said tube downwardly through said elongated slot thereby causing said tube to be squeezed by said parallel edges of said slot in order to expel at least a portion of said contents of said tube.

9. A device for holding and expelling the contents of a collapsible tube according to claim 8 wherein said first wedging portion includes a downwardly depending resilient second wall portion retained in at least close proximity to said downwardly wall portion and terminating in a generally laterally projecting flange at an elevation below that of the edges forming said elongated slot, said flanges of said levers being normally resiliently urged toward each other and being effective to at times engage opposite sides of said collapsible tube as said tube is forced through said elongated slot in order to prevent unintentional withdrawal of said tube upwardly from said elongated slot.

10. In a device for holding and expelling the contents of a collapsible tube, the combination of a body including a base, a first opening formed in said body for receiving therethrough and squeezing said collapsible tube, pivotal lever means carried by said body, said lever means being adapted to be actuated toward said collapsible tube in said first opening for simultaneously engaging said tube and forcing said tube further through said first opening in order to thereby collapse said tube and expel a quantity of said contents, means carried by said body for gripping a collapsed portion of said tube and precluding movement of said tube in a direction opposite to that resulting from the action of said lever means in forcing said tube into said first opening, and a second opening formed in an end of said body for enabling withdrawal of said collapsible tube from said body in a direction generally parallel to the pivotal axes of said lever means when said collapsible tube has been sufficiently evacuated of its contents.

11. A device for holding and expelling the contents of a collapsible tube, comprising a body including upper, lower and side portions, a bore formed in said body, a relatively narrow elongated slot formed in said upper portion of said body and extending downwardly to said bore, a pair of lever members pivotally carried by said side portions of said body and oppositely disposed about said elongated slot so as to have pivotal action about axes which are substantially parallel to said elongated slot, said lever members being effective to engage and grip outer surfaces of said collapsible time in order to drive said tube downwardly into said narrow elongated slot thereby collapsing a portion of said collapsible tube and expelling a quantity of said contents for said collapsible tube, and a generally tubular curled resilient member contained within said bore and having curled edges forming an opening in general alignment with said narrow elongated slot, said tubular curled resilient member being effective for continually engaging opposed sides of said collapsible tube as said tube is driven downwardly through said slot in order to provide a wiping action against said tube thereby assuring substantially complete evacuation of that portion of the said tube experiencing said wiping action, said tubular curled resilient member also being effective to provide a biting action against said opposed sides of said collapsible tube in order to prevent withdrawal of said collapsible tube upwardly through said narrow elongated slot.

12. A device for holding and expelling the contents of a collapsible tube according to claim 11 including a resilient gripper member received generally within said bore and between said tubular member and said body, said gripper having upwardly directed portions with generally inwardly bent arm portions formed at the ends thereof, said gripper arm portions being confined by said levers so as to be generally between said levers and said body, said gripper arm portions including contoured edges adapted for engaging and driving said collapsible tube downwardly through said narrow elongated slot and between said curled edges whenever said levers are rotated against said upwardly directed portions and inwardly bent arm portions of said gripper in order to at least partly expel a portion of the contents from said tube.

References Cited
UNITED STATES PATENTS

| | | | |
|---|---|---|---|
| 2,492,533 | 12/1949 | Olsen | 222—103 |
| 2,567,767 | 9/1951 | Ditmanson | 222—105 X |
| 2,491,161 | 12/1949 | Campbell | 222—105 X |

ROBERT B. REEVES, Primary Examiner

N. L. STACK, Assistant Examiner